(12) United States Patent
Duffy et al.

(10) Patent No.: US 6,437,955 B1
(45) Date of Patent: Aug. 20, 2002

(54) FREQUENCY-SELECTIVE CIRCUIT PROTECTION ARRANGEMENTS

(75) Inventors: Hugh Duffy, Cupertino; John Midgley, San Carlos; Brian Thomas, San Francisco, all of CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/536,905

(22) Filed: Mar. 28, 2000

Related U.S. Application Data

(63) Continuation of application No. 09/311,785, filed on May 14, 1999, now abandoned, which is a continuation of application No. 09/145,799, filed on Sep. 2, 1998, now abandoned, which is a continuation of application No. 08/584,861, filed on Jan. 5, 1996, now abandoned.
(60) Provisional application No. 60/003,733, filed on Sep. 14, 1995.

(51) Int. Cl.⁷ ................................................. H02H 3/16
(52) U.S. Cl. .......................................... 361/45; 361/113
(58) Field of Search ............................... 361/42–50, 58, 361/88, 93.1, 93.5, 93.6, 93.7, 113

(56) References Cited

U.S. PATENT DOCUMENTS

| | | | |
|---|---|---|---|
| 3,970,975 A | 7/1976 | Gryctko | 335/18 |
| 4,044,395 A | 8/1977 | Eckart | 361/44 |
| 4,052,751 A | * 10/1977 | Shepard | 361/50 |
| 4,068,276 A | 1/1978 | Pintell | 361/46 |
| 4,084,203 A | 4/1978 | Dietz et al. | 361/45 |
| 4,115,829 A | 9/1978 | Howell | 361/45 |
| 4,233,640 A | 11/1980 | Klein et al. | 361/44 |
| 4,344,100 A | 8/1982 | Davidson et al. | 361/45 |
| 4,348,708 A | 9/1982 | Howell | 361/45 |
| 4,521,824 A | 6/1985 | Morris et al. | 361/45 |
| 4,598,331 A | 7/1986 | Legatti | 361/46 |
| 4,618,907 A | 10/1986 | Leopold | 361/45 |
| 4,783,713 A | 11/1988 | Chen | 361/48 |
| 4,816,958 A | 3/1989 | Belbel et al. | 361/93 |
| 4,931,894 A | 6/1990 | Legatti | 361/45 |
| 4,949,214 A | 8/1990 | Spencer | 361/95 |
| 4,994,933 A | 2/1991 | Matsuoka | 361/42 |
| 5,177,657 A | 1/1993 | Baer et al. | 361/45 |
| 5,179,490 A | 1/1993 | Lawrence | 361/42 |
| 5,198,955 A | 3/1993 | Willner | 361/42 |
| 5,202,662 A | 4/1993 | Bienwald et al. | 361/42 |
| 5,361,183 A | 11/1994 | Wiese | 361/42 |
| 5,590,012 A | 12/1996 | Dollar, II | 361/113 |
| 5,666,255 A | * 9/1997 | Muelleman | 361/111 |
| 5,745,322 A | 4/1998 | Duffy et al. | 361/45 |
| 5,864,458 A | 1/1999 | Duffy et al. | 361/93 |

FOREIGN PATENT DOCUMENTS

| | | | |
|---|---|---|---|
| CA | 2002304 | 1/1992 | |
| DE | 1763550 | 8/1971 | ............ H09H/5/04 |
| EP | 0373676 | 6/1990 | |
| GB | 2260043 | 3/1993 | |

OTHER PUBLICATIONS

Technology for Detecting and Monitoring Conditions that Could Cause Electrical Wiring System Fires, Underwriteres Laboratories Inc., Sep. 1995.

International Search Report for International Application No. PCT/US96/19105 dated Mar. 26, 1997.

* cited by examiner

*Primary Examiner*—Kim Huynh

(57) ABSTRACT

A conventional ground fault circuit interrupter (GFCI) is modified to provide frequency-selective current protection. A control element is connected in series with the line path (or return path) of the GFCI, and a bypass element is connected in parallel with the combination of the control element and the line path (or return path) of the GFCI. Under normal conditions, little or no current flows through the bypass element. However, frequency response characteristics of the control and/or bypass elements are such that a frequency-selective component of the current (i.e. high-pass, low-pass or band-pass) is diverted through the bypass element. When the magnitude of the frequency-selective component reaches a predetermined value, the bypass current flow causes sensing of a resulting current imbalance and tripping of the GFCI.

17 Claims, 6 Drawing Sheets

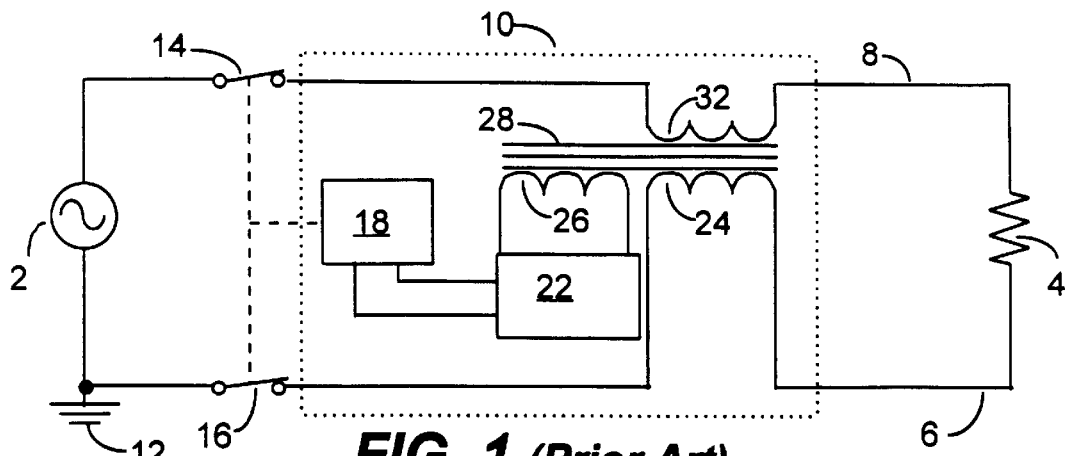
FIG. 1 *(Prior Art)*
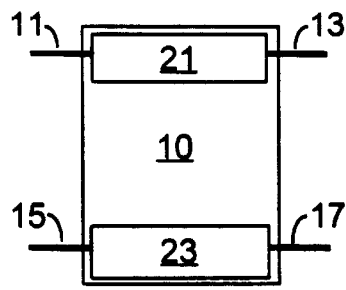
FIG. 2 *(Prior Art)*
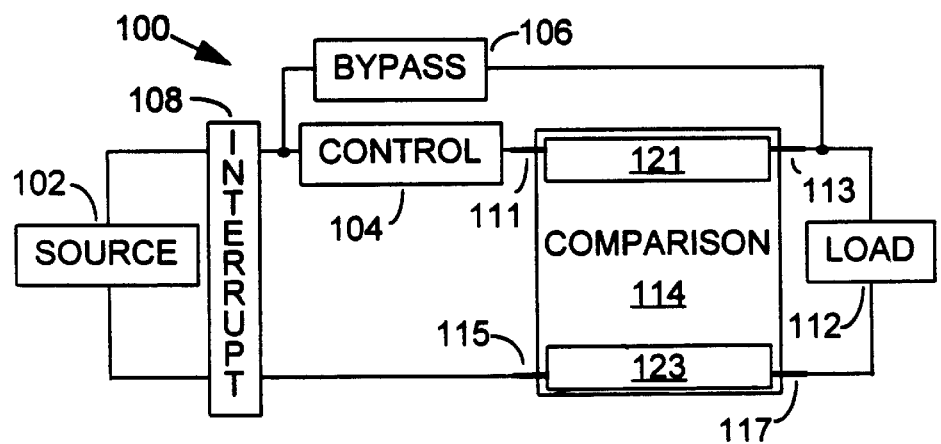
FIG. 3

FREQUENCY-SELECTIVE CIRCUIT PROTECTION ARRANGEMENTS

RELATED APPLICATIONS

The present application is a continuation of commonly assigned U.S. patent application Ser. No. 09/311,785, filed on May 14, 1999, abandoned, which is a continuation of commonly assigned U.S. patent application Ser. No. 09/145,799, filed on Sep. 2, 1998, abandoned, which is a continuation of U.S. patent application Ser. No. 08/584,861 filed on Jan. 5, 1996, now abandoned.

Also, this application is related to commonly assigned U.S. Provisional Patent Application Serial No. 60/003,733, filed Sep. 14, 1995, abandoned in favor of commonly assigned U.S. patent application Ser. No. 08/564,465, filed Nov. 29, 1995, now U.S. Pat. No. 5,864,458, and commonly assigned U.S. patent application Ser. No. 08/563,321, filed Nov. 28, 1995, now U.S. Pat. No. 5,745,322.

BACKGROUND OF THE INVENTION

1. Field of the Invention

The present invention relates to electrical circuit protection.

2. Introduction to the Invention

Ground fault interrupters (GFIs) are widely used to provide protection from the harmful effects which can result when there is leakage from an electrical circuit to ground. GFIs compare the current flowing at two different locations in a circuit, and interrupt the circuit if the currents differ by more than a predetermined value, e.g. as the result of a ground fault between the locations. GFIs do not, however, protect against faults which do not result in such a current imbalance, e.g. an overcurrent resulting from a short within the load, an overvoltage arising from lighting, electrostatic discharge, switching of reactive loads, etc., or a current or voltage having a frequency different from, e.g. higher than, the excitation frequency (e.g., 50 Hz or 60 Hz) of the power source of the circuit.

There are many circumstances in which a circuit may be subject to a current or voltage which has a frequency other than the excitation frequency and which is potentially harmful. For example, devices such as motors, phase controllers, non-linear loads and DC power supplies can inject or reflect currents at harmonics (i.e., multiples) of the excitation frequency. Other devices, such as inverters, non-linear loads and switching power supplies can cause currents at high frequencies which are not necessarily harmonics of the excitation frequency. In some circumstances it is desirable to protect a load from potential harmful effects of such high or low frequency currents. In some circumstances it is desirable to protect the power source, particularly, for example, from harmonics generated by reactive loads which result in a reduction of the power factor.

In addition, the presence of even modest currents at high frequencies can be indicative of an unusual condition which should be corrected. For example, some self regulating heating cables containing conductive polymers, if improperly installed or operated, can generate arcs which have a broad frequency spectrum.

Therefore, there is a need to protect electrical circuits from currents or voltages at frequencies different from the excitation frequencies of the circuits.

SUMMARY OF THE INVENTION

We have been investigating the use of GFIs in arrangements which provide overcurrent and/or overvoltage protection in electrical circuits in addition to protection from ground faults. A number of such arrangements are disclosed in the earlier applications incorporated by reference herein. We have discovered, in accordance with the present invention, that very useful frequency-selective protection systems can be produced using GFIs. Such frequency-selective systems can be configured to protect from currents or voltages at frequencies above a selected frequency (referred to in this specification as high-pass), and/or from currents or voltages at frequencies below a selected frequency (refereed to in this specification as low-pass) and/or from currents or voltages at frequencies within a selected frequency range (referred to in this specification as band-pass). As used in this specification: (i) "frequency-selective protection" refers to protection from currents and/or voltages in one or more selected high-pass, low-pass or band-pass ranges; and (ii) "frequency-selective current" and "frequency-selective voltage" refer respectively to a current or voltage having a frequency in one or more selected high-pass, low-pass or band-pass ranges.

As used herein, the frequency response of a GFI circuit refers to the response of the GFI circuit to a current imbalance as a function of frequency, as compared with the response of the GFI circuit to a current imbalance at the excitation frequency of the power supply. As used herein, the frequency response range of a GFI circuit refers to the frequency range, above and/or below the excitation frequency of the power supply, within which the GFI circuit will trip on a specified current imbalance level. As used herein, a specified current imbalance level refers to a current imbalance level at which it is intended for a particular frequency-selective protection arrangement to cause the GFI circuit in that arrangement to trip.

In one embodiment of the invention, frequency-selective current protection is provided by connecting a control element in series with the line path (or return path) of a GFI, and a bypass element in parallel with the combination of the control element and the line path (or return path) of the GFI. Under normal current conditions, little or no current flows through the bypass element. However, the frequency response characteristics of the control and bypass elements are such that a frequency-selective component (i.e. high-pass, low-pass or band-pass) of the current in the circuit is diverted through the bypass element. Therefore, when the magnitude of such a frequency-selective component reaches a predetermined value, a resulting current imbalance in the GFI causes the GFI to trip. Circuit protection systems in accordance with this first embodiment are particularly useful to protect against currents at frequencies which are within the frequency response range of typical GFI circuits, e.g. as high as 1 kHz, preferably as high as 10 kHz, especially as high as 25 kHz This facilitates the use of GFI circuits, without modification, in systems of the invention.

In a second embodiment of the invention, frequency-selective voltage protection is provided by connecting a bypass element: 1) from the line path input, through a GFI transformer, to the return path output of the GFI; 2) from the line path input to the return path input of a GFI; 3) from the line path output through a GFI transformer, to the return path input of the GFI; or 4) from the line path output to the return path output of a GFI. Under normal conditions, little or no current flows through the bypass element However, when a frequency-selective voltage above a predetermined voltage value is present across the bypass element, an increased current passes through the bypass element creating a current imbalance in the GFI and causing the GFI to trip. Circuit protection systems in accordance with this second embodiment are particularly useful to protect against voltages at frequencies which are within the frequency response range of typical GFI circuits, again facilitating the use of GFI circuits, without modification, in systems of the invention.

In a third embodiment of the invention, frequency-selective current protection is provided by connecting (i) a bypass element: 1) from the line path input, through a GFI transformer, to the return path output of the GFI; 2) from the line path input to the return path input of a GFI; 3) from the line path output through a GFI transformer, to the return path input of the GFI; or 4) from the line path output to the return path output of a GFI; and (ii) a control element in the line (or return line) of the circuit. Under normal conditions, little or no current flows through the bypass element. However, when a frequency-selective current above a predetermined current value is present, the control element causes the bypass element to pass a portion of the circuit current, thereby creating a current imbalance in the GFI and causing the GFI to trip. Circuit protection systems in accordance with this third embodiment can protect against currents at frequencies within the frequency response range of typical GFI circuits. In addition, however, they are also useful to protect. against currents at frequencies which are outside the frequency response range of typical GFI circuits, again facilitating the use of GFI circuits, without modification, in systems of the invention. This feature is facilitated by the use of a control element which is capable of detecting a current at a frequency outside the frequency response range of the GFI circuit When the control element detects a current within a frequency-selective range, and above a predetermined current value, the control element causes the bypass element to pass a portion of the circuit current, which includes current at the excitation frequency of the power source, i.e. within the frequency response range of the GFI circuit As a result, the GFI trips on the current imbalance. In this manner, the magnitude of the imbalance current which passes through the bypass element is independent of the magnitude of the frequency-selective current which triggers the control element.

In a fourth embodiment of the invention, frequency-selective voltage protection is provided by connecting (i) a bypass element: 1) from the line path input, through a GFI transformer, to the return path output of the GFI; 2) from the line path input to the return path input of a GFI; 3) from the line path output through a GFI transformer, to the return path input of the GFI; or 4) from the line path output to the return path output of a GFI; and (ii) a control element from the line to the return line, in parallel with the load. Under normal conditions, little or no current flows through the bypass element. However, when a frequency-selective voltage is present across the control element, and exceeds a predetermined voltage value, the control element causes the bypass element to pass a portion of the circuit current, thereby creating a current imbalance in the GFI and causing the GFI to trip. Circuit protection systems in accordance with this fourth embodiment can protect against voltages at frequencies within and/or outside the frequency response range of typical GFI circuits, and again facilitate the use of GFI circuits, without modification, in systems of the invention.

Thus, in accordance with the invention, commonly available GFI devices may be used to provide integrated frequency-selective protection in electrical circuits, devices and systems, in addition to protection from ground faults.

In the several embodiments of the invention, frequency-selective current and/or voltage protection is provided using commonly available GFI circuits without modification. However, this is not to preclude the modification of such GFI circuits, for example, to expand the frequency-response range of such GFI circuits, or to amplify the response of the GFI circuits within a frequency-selective range of interest. Such modifications may include, for example, the use of different GFI transformers or other components in the GFI circuit.

In general, the control and bypass elements comprise electrical components arranged to form filter circuits. Such filter circuits may range from fairly simple to complex tuned circuits, and can be used individually or in combination to produce low-pass, high-pass, band-pass and combination filters with steep or gradual roll-off characteristics. While many such filter circuits are known, we have discovered such circuits can be used in combination with GFI circuits in accordance with the present invention to provide frequency-selective circuit protection. Moreover, while the filter circuits shown in the examples of the several embodiments of the invention described herein are generally simple combinations, such is intended to be merely by way of example and is not intended to limit or exclude the use of more complex filter circuits.

The term "ground fault" is used in this specification to denote any fault, external to a comparison element such as a GFI, which causes a current to flow in one sense line of the comparison element, which is not matched by an equal and opposite current in the other sense line of the comparison element. The term "external to a comparison element" is used in this specification to refer to any point in a circuit between the line sense output of the comparison element and the return sense input of the comparison element.

The protection systems of the invention may be configured to provide both frequency-selective current and frequency-selective voltage protection in addition to the normal ground fault interrupt protection provided by the GFI or other comparison element. They may also be configured to provide only frequency-selective current or frequency-selective voltage protection in addition to the ground fault interrupt protection.

The protection systems of the invention may also be configured with remote control and switching capability. For example, a protection system may be configured to trip on a tone at a particular frequency, which tone may be remotely injected onto the line to cause the protection system to trip. For example, a utility company could remotely disconnect a consumer either to test the connection or for non-payment. In addition, a circuit protection system (overcurrent, overvoltage, frequency-selective) at one location could remotely trip a circuit protection system at another location. For example, if each plug in a circuit were set to trip at a different current level, each trip detector could be configured to send a tone back to the circuit breaker to cause it to interrupt. Thus, each circuit could have its trip current individually set, but only one central interrupting breaker would be required.

BRIEF DESCRIPTION OF THE DRAWINGS

The invention is illustrated in the accompanying drawings, in which like components are given the same reference numerals in each FIG. in which they appear, and like components shown comprising additional features in subsequent FIGS. are given the same reference number with a prime (e.g., 10', 114'), and in which:

FIG. 1 is a circuit diagram of a known circuit including a conventional GFI device.

FIG. 2 is a block diagram representing a known GFI circuit.

FIG. 3 is a block diagram of a circuit using the first embodiment of the invention.

DETAILED DESCRIPTION OF THE INVENTION

Figure 4:
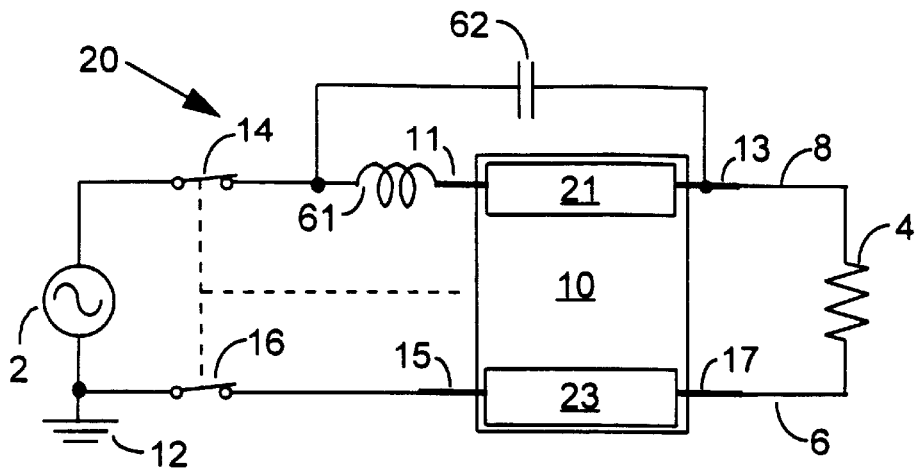
FIGS. 4 and 5 are examples of the circuit of FIG. 3.

This invention provides a circuit protection system which provides protection from (A) ground faults and (B) currents or voltages in selected frequency ranges in electrical circuits. One of the merits of this invention is that it can make use of GFI devices which are widely available, or of simple modifications of such devices. In the detailed description of the invention, therefore, reference will often be made to the GFI circuits as performing the function of a comparison element It is to be understood, however, that the invention can make use of any comparison element which will provide the defined functional characteristics.

The predetermined current imbalance, $I_{IMBALANCE}$, which will "trip" the comparison element (i.e. cause it to change from its normal state to its fault state) is preferably a fixed value in the range of 5 to 20 ma, which represents typical GFI specifications. However, lower or higher values of $I_{IMBALANCE}$ can be used if greater or less sensitivity to ground faults can be tolerated.

The comparison element will normally have a single fixed value of $I_{IMBALANCE}$, but it is also possible for the comparison element to include means for changing the value of $I_{IMBALANCE}$ from one predetermined value to another.

A GFI generally comprises a transformer ring having a primary line winding, a corresponding primary return line winding, a secondary winding which connects to a level detection circuit, as well as a separate test wire which passes through the transformer ring and is used when testing the GFI. When such a GFI is used in this invention, the primary line winding is made part of the line of the circuit and provides the line sense point as it passes through the transformer ring, and the primary return line winding is made part of the return line of the circuit and provides the return sense point as it passes through the transformer ring. When the system of the invention includes a passthru line, the separate test wire can be used as the passthru line and provides the passthru sense point as it passes through the transformer ring. When there is no passthru line, the separate test wire is not used and does not affect the operation of the system. The transformer ring and the primary line winding together provide the line sense component, and the transformer ring and the primary return line winding together provide the return sense component. When a passthru line is used, the transformer ring and separate test wire together provide the passthru sense component. The transformer ring, the secondary winding and a level detection circuit in the GFI provide the comparison element. The net effective current, $I_{COMPARISON}$, is the net current sensed by the transformer ring from the contributions of currents in the primary line winding, the primary return line winding and, if used, the separate test wire. A current proportional to $I_{COMPARISON}$ is generated in the secondary winding and is sensed by the level detection circuit, which, when the current in the secondary winding indicates that $I_{COMPARISON}$ increases from a value below $I_{IMBALANCE}$ to a value above $I_{IMBALANCE}$, energizes (or deenergizes) a GFI relay and disconnects the load from the circuit A conventional GFI can, if desired, be modified so that a passthru line passes through the transformer ring two or more times to obtain amplification of the effect of $I_{BYPASS}$. This can be used to advantage especially when it is intended to use a GFI to trip on a current at a frequency which is toward an upper or lower end of the frequency response range, i.e., to increase the level of the frequency-selective imbalance current to a specified current imbalance level which will trip the GFI.

In a first embodiment of the invention, the bypass element of the system is connected so that it spans one, but not both, of the line sense point and the return sense point. In this embodiment, which does not make use of the passthru sense, a single control element is series connected in the line (or return line) of the operating circuit within the span of the bypass element. In one example of this embodiment, which example provides a high-pass frequency-selective current protection, the control element is selected so that its impedance increases with frequency, and such a bypass element is selected so that its impedance decreases with frequency. Thus, at higher frequencies, current in the circuit is diverted through the bypass element and around one of the line sense point and return sense point of the comparison element. In a second example of this embodiment, which example provides a band-pass frequency-selective current protection, the control element is a parallel tuned circuit and the bypass element is a series tuned circuit. The values of the components comprising the parallel and series tuned circuits are selected to provide a frequency-selective transfer function which peaks in a selected frequency band.

In a second embodiment of the invention, the bypass element of the system is connected (1) between the line sense input and the return sense input, (2) between the line sense output and the return sense output, (3) between the line sense input and the return sense output and comprises a passthru line, or (4) between the line sense output and the return sense input and comprises a passthru line. In this second embodiment of the invention, the bypass element comprises one or more capacitors and/or one or more inductors, and the system does not comprise a control element. The capacitor(s) and/or inductor(s) comprising the bypass element are selected and arranged so that the bypass element passes very little current at the excitation frequency of the power source. However, when a voltage across the bypass element has a component which is within a selected frequency range, the bypass element will pass a current at the frequency of such voltage.

In a third embodiment of the invention, the bypass element of the system again is connected (1) between the line sense input and the return sense input, (2) between the line sense output and the return sense output, (3) between the line sense input and the return sense output and comprises a passthru line, or (4) between the line sense output and the return sense input and comprises a passthru line. In this third embodiment of the invention, the bypass element comprises a switching device, and the system comprises a single control element which is connected in the line (or return line) of the operating circuit. The control element is a frequency-selective current-responsive component and is coupled with the switching device. The frequency-selective current-responsive component is selected so that, when the component of $I_{LINE}$ within a selected frequency range is a normal value, the frequency-selective current-responsive component causes the switching device to remain in an open state, and when the component of $I_{LINE}$ within the selected frequency range exceeds a predetermined current value, $I_{TRIP-FREQUENCY-RANGE}$, the frequency-selective current-responsive device causes the switching device to change to a closed state.

In a fourth embodiment of the invention, the bypass element again is connected (1) between the line sense input and the return sense input, (2) between the line sense output and the return sense output, (3) between the line sense input and the return sense output and comprises a passthru line, or (4) between the line sense output and the return sense input and comprises a passthru line. In this fourth embodiment of the invention, the bypass element comprises a switching device, and the system comprises a single control element which is connected between the line and return line of the operating circuit in parallel with the load. The control element is a frequency-selective voltage-responsive component and is coupled with the switching device. The frequency-selective voltage-responsive component is elected so that, when the voltage across it within a selected frequency range is a normal value, the frequency-selective voltage-responsive component causes the switching device to remain in an open state, and when the voltage across it within a selected frequency range exceeds a predetermined value $V_{LOAD-TRIP-FREQUENCY-RANGE}$, the frequency-selective voltage-responsive device causes the switching device to change to a closed state.

A prior art circuit including a conventional GFI device is shown in FIG. 1. To simplify description of the circuits in subsequent FIGS., the components comprising the GFI device, except for a first set of contacts 14 and second set of contacts 16, are shown within the dotted lines, are referred to as the GFI circuit, and are given the general reference character 10. In a conventional GFI device, line 8 and return 6 currents flow in opposite directions in two primary windings 32,24 of a GFI transformer 28. If the line 8 and return 6 currents are equal, the resulting magnetic field in the GFI transformer 28 is zero and the induced current in a secondary winding 26 is essentially zero. If the line 8 and return 6 currents are not equal, for example in the case of a ground fault from the line 8 to ground 12, then the imbalanced currents cause a magnetic field in the GFI transformer 28. If the current imbalance exceeds a first established threshold, the resulting magnetic field in the GFI transformer 28 causes an induced current in the secondary winding 26 to exceed a second established threshold. A detection circuit 22 determines that the induced current in the secondary winding 26 exceeds the second established threshold and energizes a latching relay 18 (or deenergizes an active relay). When the latching relay 18 is energized, the normally closed contacts 14,16 are opened thereby removing the power applied to a load 4. The contacts 14 16 remain open until they are manually reset to the closed position.

FIG. 2 shows the GFI circuit 10 with its respective inputs and outputs. As described herein, the GFI circuit 10 has a line path 21 which comprises a line path input 11 and a line path output 13. The GFI circuit 10 also has a return path 23 which comprises a return path input 17 and a return path output 15. Power is applied across the line path input 11 and return path output 15, and the load is connected across the line path output 13 and return path input 17. The line path 21 refers to that portion of the GFI circuit 10 which senses the current level in the line 8, and the return path 23 refers to that portion of the GFI circuit 10 which senses the current level in the return line 6.

FIG. 3 shows a block diagram depicting operational elements of an embodiment of a first aspect of a circuit protection system of this invention. The operational elements represent the functions performed by the components comprising the protection system. The source 102 provides the electrical power to the circuit, and the load 112 performs the intended purpose of the circuit. The control 104, bypass 106, comparison 114 and interrupt 108 elements work cooperatively to provide frequency-selective current protection. In a frequency-selective current situation, the control element 104 diverts current to the bypass element 106, thereby creating an imbalance (between the line and return currents) to be detected by the comparison element 114. When the current diverted to the bypass element 106 reaches an established threshold, the comparison element 114 communicates with the interrupt element 108 causing the interrupt element 108 to reduce or stop the flow of current delivered to the load 112. Analogous to the description of the GFI circuit 10 in FIG. 2, the comparison element 114 has a line sense 121 which comprises a line sense input 111 and a line sense output 113, and a return sense 123 which comprises a return sense input 117 and a return sense output 115.

As described herein, there lies a point, located within the line sense 121, between the line sense input 111 and the line sense output 113, which is referred to herein as the line sense point; and there lies a point, located within the return sense 123, between the return sense input 115 and the return sense output 117, which is referred to as the return sense point.

The circuit in FIG. 4 is an example of a GFI protection system in accordance with the first embodiment of the invention. This is a high-pass frequency-selective current protection system. In the circuit 20, an inductor 61 is series connected in the line between the power supply 2 and the line path 21 of the GFI circuit 10. A capacitor 62 is connected in parallel with the series combination of the inductor 61 and the line path 21 of the GFI circuit 10. The values of the inductor 61 and capacitor 62 are chosen so that at the excitation frequency of the power source 2, the impedance of the inductor 61 is low and the impedance of the capacitor 62 is high. Thus, very little current at the excitation frequency will flow through the capacitor 62. It is preferred that the current at the excitation frequency through the capacitor 62 be very low because any current flowing through the capacitor under normal circuit conditions would cause an imbalance current in the GFI circuit 10, and thereby reduce the level of leakage (i.e. ground fault) current necessary to trip the GFI circuit 10.

As an example of the operation of the protection system in the circuit of FIG. 4, assume the load 4 is a self-regulating heater strip with an arcing condition at its remote end. Under such circumstances, the arc currents may be on the order of one or more amps, and at a high frequency. As the frequency increases, the impedance of the inductor 61 increases and the impedance of the capacitor 62 decreases. Thus, as the frequency increases, the magnitude of the current shunted through the capacitor 62 likewise increases. If the level of the shunted current, at frequencies within the frequency response range of the GFI circuit 10, exceeds the trip level of the GFI circuit 10, the GFI circuit 10 will trip and open the contacts 14,16.

In this example, the protection system is designed to trip at a high-pass current of I amp, with the GFI circuit set to trip at an imbalance current, within the frequency response range of the GFI circuit, of 5 ma. Assume a current arc of one amp at a frequency of 10 kHz. Also assume the inductor 61 has an inductance of $1 \times 10^{-3}$ H, and the capacitor 62 has a capacitance of $1.3 \times 10^{-9}$ F. Therefore, the magnitude of the component of the voltage across the parallel combination of the inductor 61 and capacitor 62 at 10 kHz is:

$$|V|=|I \times Z|=|I| \times |j\omega L/(1-\omega^2 LC)|$$

$$|V_{10\,kHz}|=1 \times ((2\pi \times 10^4) \times (1 \times 10^{-3}))/(1-(2\pi \times 10^4)^2 \times (1 \times 10^{-3}) \times (1.3 \times 10^{-9}))$$

$$|V_{10\,kHz}|=63.156 \text{ volts}$$

The magnitude of the component of the current in the inductor 61 at 10 kHz is:

$$|I|=|V/Z|=|V/j\omega L|=V/\omega L$$

$$|I_{L10\,kHz}|=62.51/((2\pi \times 10^4) \times (1 \times 10^{-3}))=1.0052 \text{ amps}$$

The magnitude of the component of the current in the capacitor 62 at 10 kHz is:

$$|I|=|V/Z|=|V/1/j\omega C|=V\omega C$$

$$|I_{C10\,kHz}|=62.51 \times (2\omega \times 10^4) \times (1.3 \times 10^{-9})=0.0052 \text{ amps}$$

Thus, indeed, a protection system with a $1 \times 10^{-3}$ H series inductor 61 and a $1.3 \times 10^{-9}$ F shunt capacitor 62 would provide protection against a 1 amp current at 10 kHz. Moreover, such an arrangement would have a negligible effect on the operation of the GFI circuit 10 at the excitation frequency of the power supply 2. For example, consider assume a one amp, 60 Hz current in the circuit. It can be shown that the component of the 60 Hz current shunted through the capacitor 62 is less than $0.2 \times 10^{-6}$ amps.

The above example makes two simplifying assumptions. The first assumption is that the arc current is comprised of a component at a single frequency, i.e. 10 kHz. The second assumption is that the response of the GFI circuit 10 is flat up to 10 kHz. Currents resulting from fault conditions in a circuit may comprise current components at more than one frequency. Indeed, in the heater cable example above, it is possible that the arc induced current could have components at many frequencies, including frequencies as high as 1 MHz, or even higher. The effect of the inductor 61/capacitor 62 combination is, of course, to integrate the high frequency current at all frequencies bypassing the line side 21 of the GFI circuit 10. The GFI circuit 10 would thus trip on a total current imbalance of 5 ma within the frequency response range of the GFI circuit 10. The frequency response of the GFI circuit is typically dependent on the response of the transformer core and the sensitivity of the level detection circuit.

Figure 5:
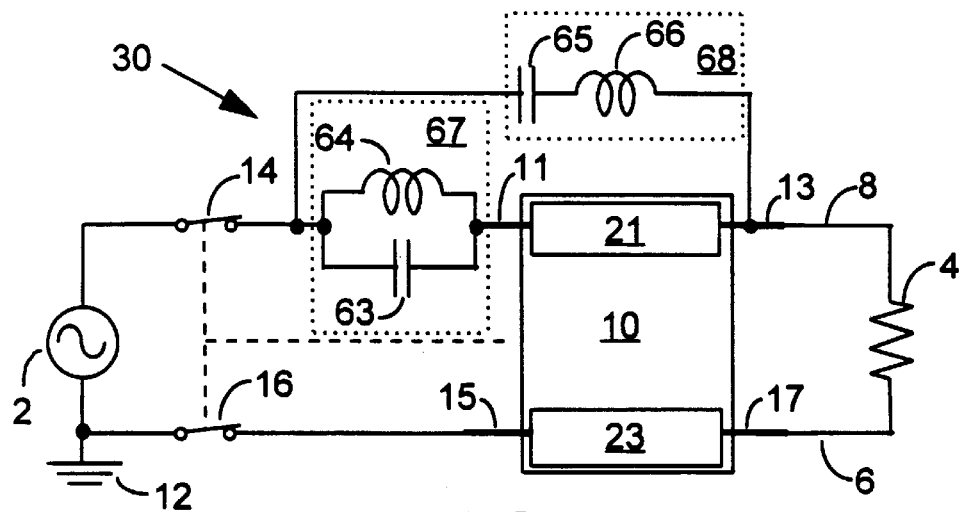

The circuit in FIG. 5 is a second example of a GFI protection system in accordance with the first embodiment of the invention represented by the block diagram in FIG. 3. In the circuit 20, the control element 104 is comprised of a parallel tuned circuit 67 which is comprised of a first capacitor 63 and first inductor 64. The parallel tuned circuit 67 is series connected in the line between the power supply 2 and the line path 21 of the GFI circuit 10. The bypass element 106 is comprised of a series tuned circuit 68 which is comprised of a second capacitor 65 and second inductor 66. The series tuned circuit 68 is connected in parallel with the series combination of the parallel tuned circuit 67 and the line path 21 of the GFI circuit 10. This example is a band-pass protection system, and would be useful, for example, in protecting against harmonics of the excitation frequency of the power supply. For example, with both the first capacitor 63 and second capacitor 65 having a capacitance of 2.8 $\mu$F, and both the first inductor 64 and second inductor 66 having an inductance of 0.1 H, the circuit 30 in FIG. 5 protects against a current at the fifth harmonic, i.e. 300 Hz, of a 60 Hz source.

Figure 6:
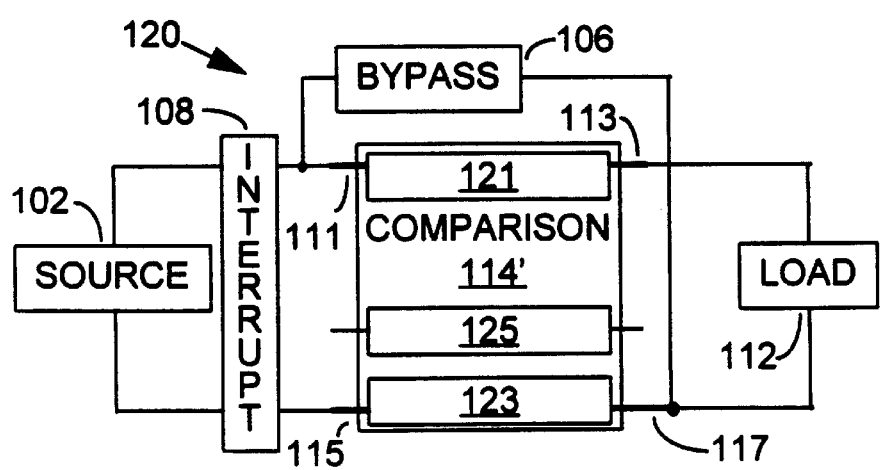
FIG. 6 is a block diagram of a circuit using the second embodiment of the invention.

FIG. 6 shows a block diagram depicting a circuit 120 comprising operational elements of a second embodiment of a circuit protection system of this invention, which embodiment provides frequency-selective voltage protection. The diagram of FIG. 6 differs from the diagram of FIG. 3 in that there is no control element 104 in FIG. 6, and a bypass element 106 is shown connected between the line sense input 111 and eturn sense input 117 of the comparison element 114'. Also, the comparison element 114' is shown comprising a passthru sense 125. In a frequency-selective voltage situation, the bypass element 106 passes current, thereby creating a current imbalance to be detected by the comparison element 114'. When the current imbalance reaches the established theshold, the comparison element 114' communicates with the interrupt element 108 causing the interrupt element 108 to reduce or stop the flow of current delivered to the load 112. FIG. 6 shows the bypass element 106 connected between the line sense input 111 and return sense input 117 of the comparison element 114'. The system provides frequency-selective voltage protection with the bypass element 106 connected between the line sense input 111 and the return sense input 117 of the comparison element 114', or between the line sense output 113 and the return sense output 115 of the comparison element 114'. In addition, the system provides frequency-selective voltage protection with the bypass element 106 connected between the line sense output 113 and the return sense output of the comparison element 114', or between the line sense output 113 and the return sense input 117 of the comparison element 114', with, in either case, the bypass element connection comprising the passthru sense 125. The function of the passthru sense 125 will be explained below with reference to FIGS. 7, 8, 9 and 10a–10d.

Figure 7:
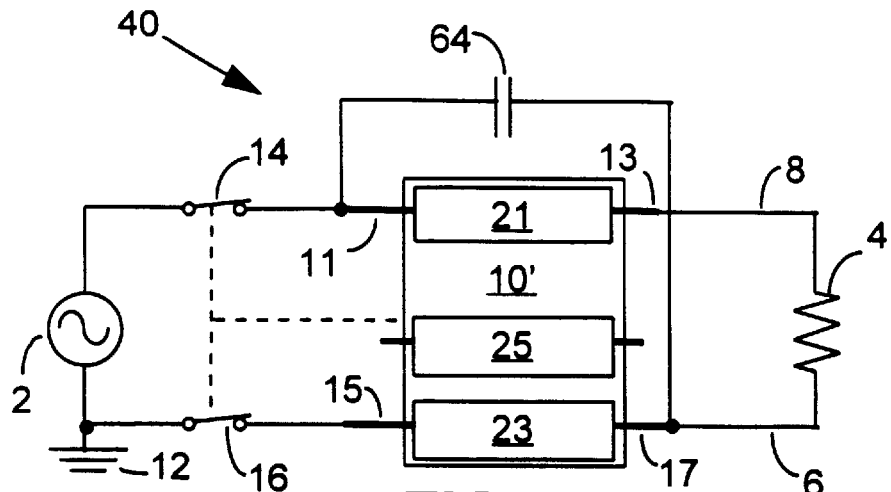
FIGS. 7, 8 and 9 are examples of the circuit of FIG. 6.

An example of a second embodiment of a GFI circuit protection system in accordance with this invention is shown in FIG. 7. In the circuit 40, a capacitor 64 is connected between the line path input 11 and the return path input 17 of the GFI circuit 10'. For circuit voltages at the excitation frequency of the power source 2, the capacitor conducts negligible current. When a frequency-selective voltage appears across the capacitor 64, the current through the capacitor 64 increases, thereby creating an imbalance in the GFI circuit 10'. If the current imbalance within the frequency response range of the GFI circuit 10' reaches the trip level, e.g. 5 ma, the GFI circuit 10' trips causing the contacts 14,16 to open. The arrangement of the circuit 40 of FIG. 7 is a high-pass frequency-selective voltage protection system. The capacitance value of the capacitor 64 may be selected depending on the frequency range and voltage level for which circuit protection is to be provided.

Figure 8:
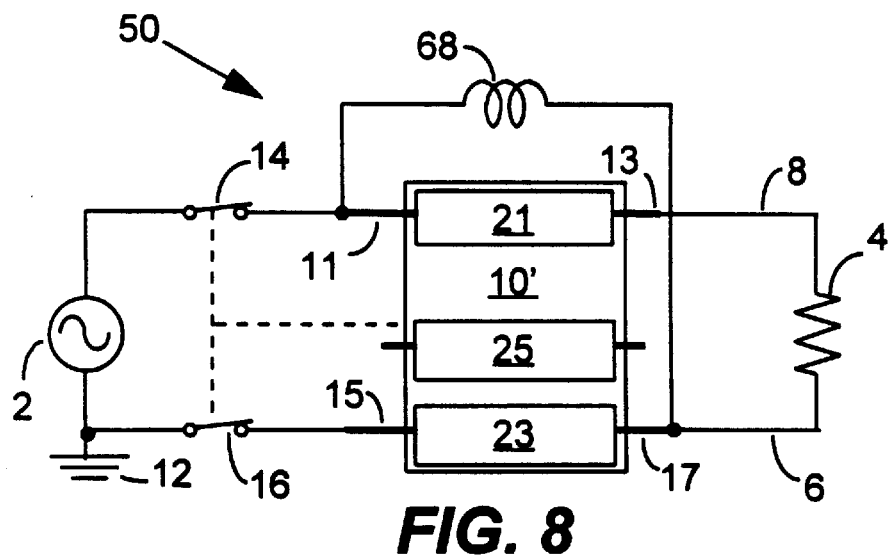

The circuit 50 of FIG. 8 is a second example of a second embodiment of a GFI circuit protection system in accordance with this invention. This circuit 50 is similar to the circuit of FIG. 8, however, the capacitor 64 is replaced by an inductor 68. The arrangement of the circuit 50 of FIG. 8 is a low-pass frequency-selective voltage protection system with the inductance value of the inductor 68 selected depending on the frequency range and voltage level for which circuit protection is to be provided.

Figure 9:
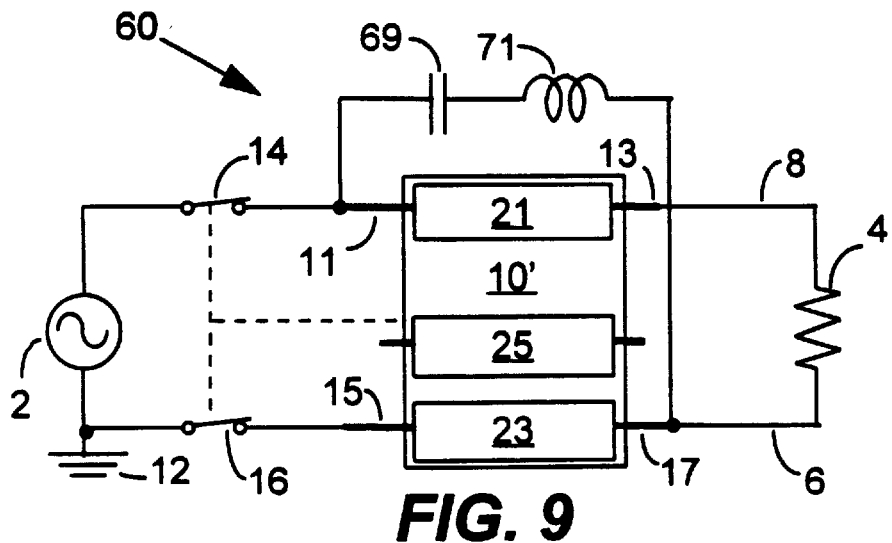

A third example of a second embodiment of a GFI circuit protection system in accordance with this invention is shown in FIG. 9. In the circuit 60 of FIG. 9, the bypass element 106 comprises a capacitor 69 and inductor 71 connected in series. This arrangement is a band-pass frequency-selective voltage protection system. The values of the capacitor 69 and inductor 71 may be selected depending on the frequency range and voltage level for which circuit protection is to be provided.

Figure 10A:
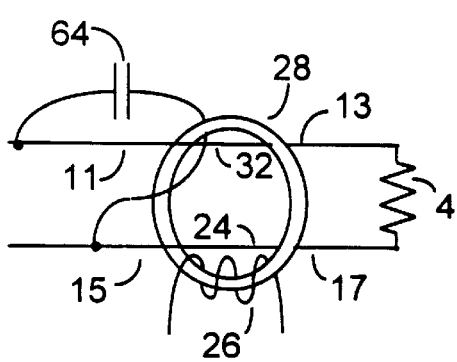
FIGS. 10a, 10b, 10c and 10d are circuit diagrams indicating different variations of a portion of the circuit shown in FIG. 7.
Figure 10B:
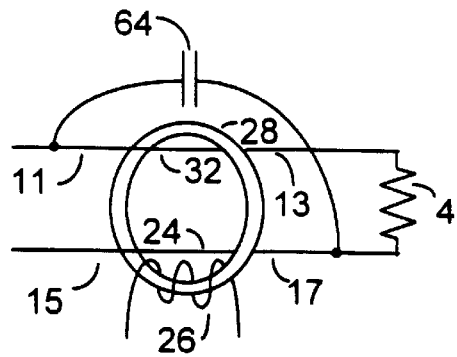
Figure 10C:
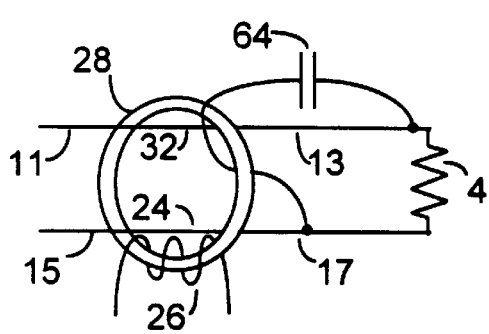
Figure 10D:
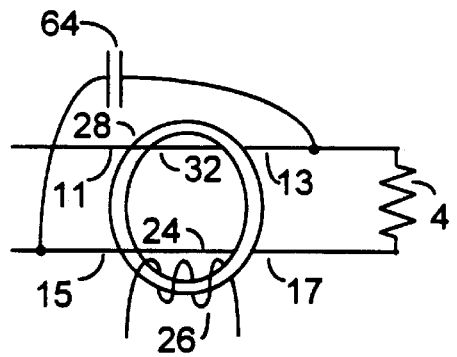

As mentioned above, circuit protection systems arranged in accordance with the second embodiment of the invention provide frequency-selective voltage protection with the bypass element 106 (e.g. capacitor 64 (FIG. 7), inductor 68 (FIG. 8), series combination of capacitor 69 and inductor 71 (FIG. 9)) connected in one of four arrangements. FIGS. 10a, 10b, 10c and 10d are circuit diagrams showing the four arrangements. The reference numerals for the components shown in the circuit diagrams of FIGS. 10a–10d are the same reference numerals for the corresponding components shown in the circuit diagrams of FIGS. 1 and 7 (the capacitor 64 of FIG. 7 is shown by way of example in FIGS. 10a–10d). The GFI transformer 28 is shown as a ring, with the primary windings 32 24 passing through the GFI transformer 28. The secondary winding 26 is shown wound around the GFI transformer 28. The capacitor 64 is shown connected in the following arrangements: 1) in FIG. 10a, between the line path input 11 and the return path output 15; 2) in FIG. 10b, between the line path input 11 and the return path input 17; 3) in FIG. 10c, between the line path output 13 and the return path input 17; and 4) in FIG. 10d, between the line path output 13 and the return path output 15. In FIGS. 10a and 10c, the capacitor 64 connection is shown passing through the GFI transformer 28. This is necessary to cause the secondary winding 26 to sense an imbalance current when current flows through the capacitor 64. The capacitor 64 connection shown in FIGS. 10a and 10c may use the separate test wire in the GFI circuit 10' for this purpose. Referring again to FIGS. 6, 7, 8 and 9, the passthru sense 125 in the comparison element 114' and a passthru path 25 in the GFI circuit 10' represent the connection passing through the GFI transformer 28.

The connections shown in FIGS. 10a–10d show the connections necessary to cause a detected current imbalance in the GFI circuit 10'. In addition, for example, in FIGS. 10b and 10d, the capacitor 64 connection may also pass through the transformer 28 to further amplify the current imbalance in the GFI circuit 10'. Also, in all four examples, the capacitor 64 connection may be wound around the transformer 28 one or more times to obtain additional amplification of the imbalance current. This may be particularly useful for applications which provide protection from voltages at frequencies which lie near the edge of the frequency response range of the GFI circuit 10'.

Figure 11:
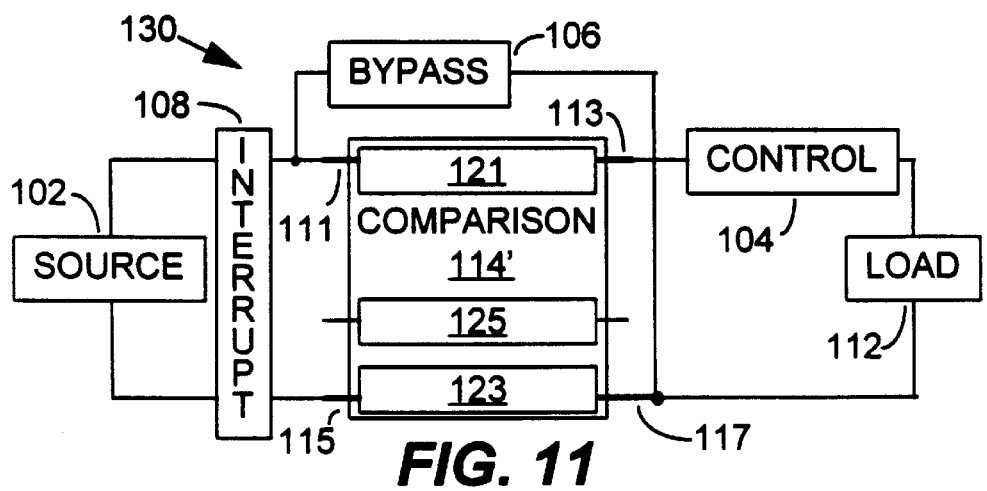
FIG. 11 is a block diagram of a circuit using the third embodiment of the invention.

Frequency-selective circuit protection systems in accordance with the first and second embodiments of the invention are particularly useful for protection against harmful currents and/or voltages at frequencies within the frequency response range of the GFI circuit. However, if a current or voltage were at a frequency outside the frequency response range of the GFI circuit, then diverting a current at such a frequency through a bypass element would not cause the GFI circuit to trip. FIG. 11 shows a block diagram depicting a circuit 130 comprising operational elements of a third embodiment of a circuit protection system of this invention, which embodiment provides frequency-selective current protection. This third embodiment is useful for providing circuit protection from currents at frequencies outside the frequency response range of the GFI circuit. It is also useful for providing protection at frequencies within the frequency response range of the GFI circuit.

The control element 104 is shown in FIG. 11 between the line sense output 113 of the comparison element 114' and the load 112. However, the control element 104 may also be placed between the source 102 and the line sense input 111, preferably between the interrupt element 108 and the line sense input 111. The control element 104 may also be placed in comparable positions in the return line, however it is preferred not to place components in the return line which would result in a voltage drop in the return line. The bypass element 106 is shown connected between the line sense input 111 and the return sense input 117 of the comparison element 114'. The bypass element 106 does not pass current during normal operation. In a frequency-selective current situation, the control element 104 detects the frequency-selective current and communicates with the bypass element 106, causing the bypass element 106 to pass current, thereby creating a current imbalance to be detected by the comparison element 114'. The comparison element 114' communicates with the interrupt element 108 causing the interrupt element 108 to reduce or stop the flow of current delivered to the load 112. FIG. 11 shows the bypass element 106 connected between the line sense input 111 and return sense input 117 of the comparison element 114'.

As discussed above in reference to FIG. 6, the system provides frequency-selective current protection with the bypass element 106 connected between the line sense input 111 and the return sense input 117 of the comparison element 114', or between the line sense output 113 and the return sense output 115 of the comparison element 114'. In addition, the system provides frequency-selective current protection with the bypass element 106 connected between the line sense output 113 and the return sense output of the comparison element 114', or between the line sense output 113 and the return sense input 117 of the comparison element 114', with, in either case, the bypass element connection comprising the passthru sense 125.

Figure 12:
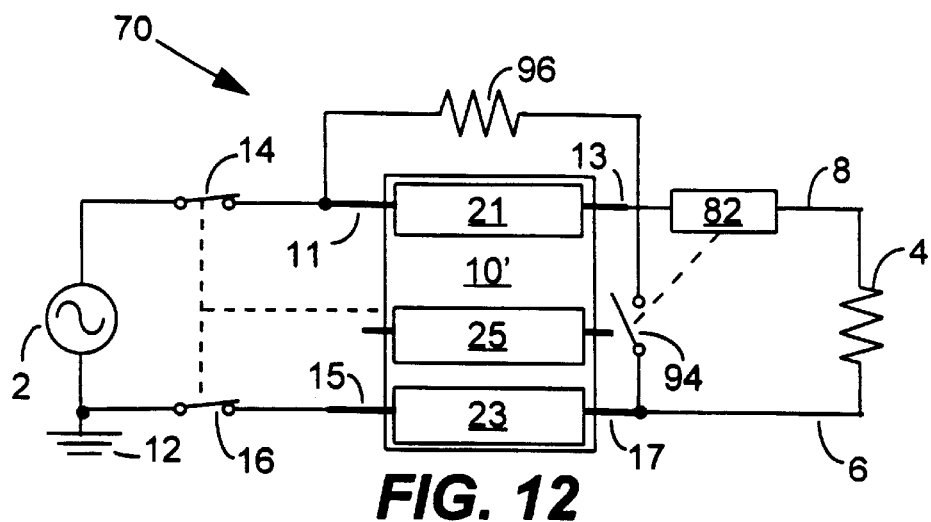
FIG. 12 is an example of the circuit of FIG. 11.
Figure 13A:
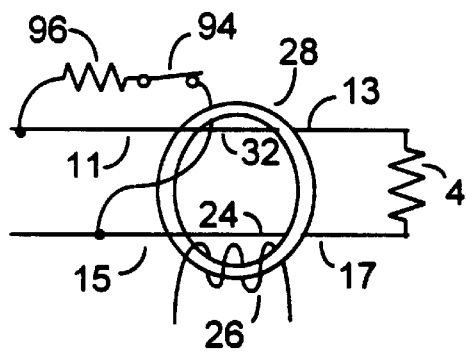
FIGS. 13a, 13b, 13c and 13d are circuit diagrams indicating different variations of a portion of the circuit shown in FIG. 12.
Figure 13B:
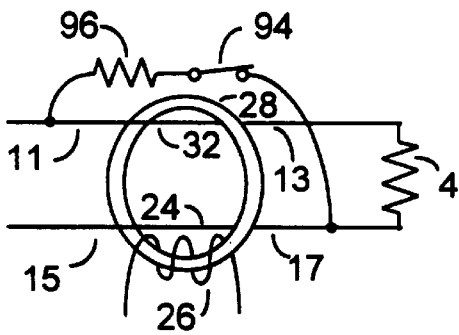
Figure 13C:
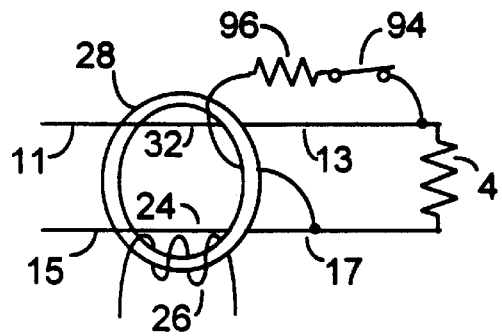
Figure 13D:
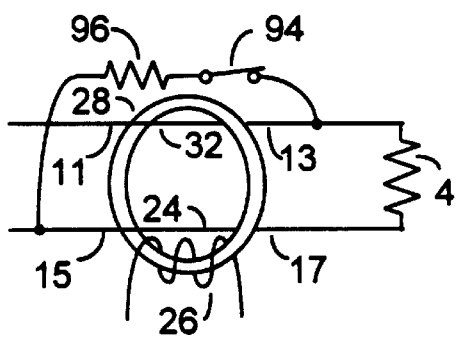

The circuit arrangement shown in FIG. 12 is an example of a third embodiment of a GFI protection system in accordance with this invention. In the circuit 70 the current in the line 8 is sensed by a frequency-selective current-sensing device such as a current-sensing relay coil 82. Depending on the frequency band of interest, the current-sensing relay coil may be combined with one or more inductors and/or capacitors in high-pass, low-pass or band-pass arrangements which are known to those skilled in the art. If a frequency-selective current should exceed a predetermined current value, the current-sensing relay coil 82 energizes, closing a set of relay contacts 94. A resulting imbalance current, limited by a resistor 96, causes the GFI circuit 10' to trip and open the contacts 14,16. The current-sensing relay coil 82 and relay contacts 94 may be replaced by a solid state current-sensing and switching arrangement In FIG. 12, the combination including the resistor 96 and relay contacts 94 is shown connected from the line path input 11 to the return path input 17 of the GFI circuit 10'. FIGS. 13a, 13b, 13c and 13d are circuit diagrams showing circuit arrangements analogous to the arrangements shown in FIGS. 10a–10d. The combination of the resistor 96 and relay contacts 94 may be connected: 1) in FIG. 13a, between the line path input 11 and the return path output 15; 2) in FIG. 13b, between the line path input 11 and the return path input 17; in FIG. 13c, between the line path output 13 and the return path input 17; and 4) in FIG. 13d, between the line path output 13 and the return path output 15. In FIGS. 13a and 13c, the connection is shown passing through the GFI transformer 28. As discussed above with regard to the frequency-selective voltage protection circuits 50,60,70, all of the connections depicted in FIGS. 13a–13d may be optionally passed through the transformer 28, and/or wound around the transformer 28 one or more times to amplify the current imbalance in the GFI circuit 10'.

Figure 14:
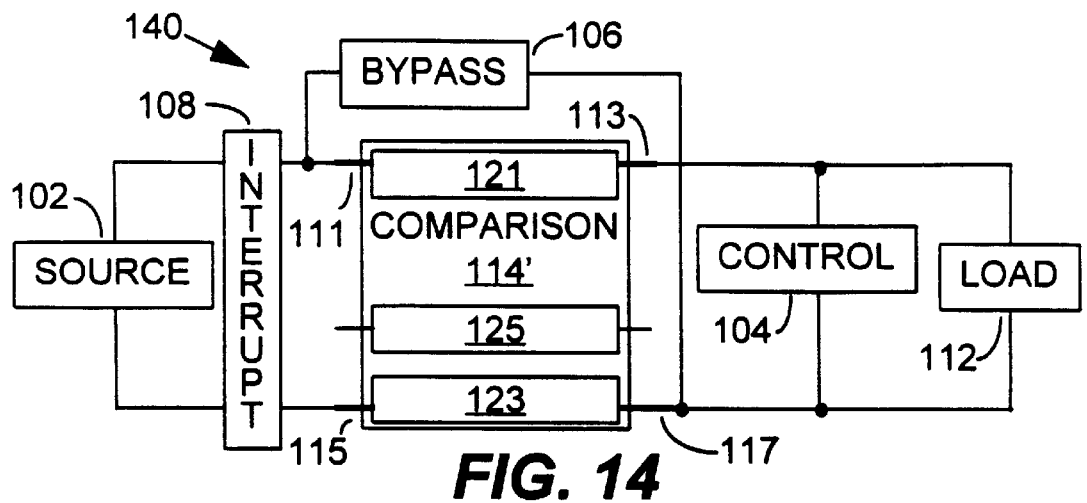
FIG. 14 is a block diagram of a circuit using the fourth embodiment of the invention.

FIG. 14 shows a block diagram depicting operational elements of a fourth embodiment of a circuit protection system of this invention, which embodiment provides frequency-selective voltage protection. In most respects, the operation of this fourth embodiment is very similar to that of the third embodiment described above. Therefore, only the differences between the two will be described. Whereas, in the third embodiment described above, the control element 104 comprises a frequency-selective current-sensing device such as a current-sensing relay coil 82, and is connected in the line 8 (or return line 6) of the circuit, in the fourth embodiment, the control element 104 comprises a frequency-selective voltage-sensing device which is connected between the line 8 and return line 6. If the control element 104 detects a frequency-selective voltage above a predetermined voltage value, the control element 104 communicates with the bypass element 106, causing the bypass element 106 to pass current, thereby creating a current imbalance to be detected by the comparison element 114'.

Figure 15:
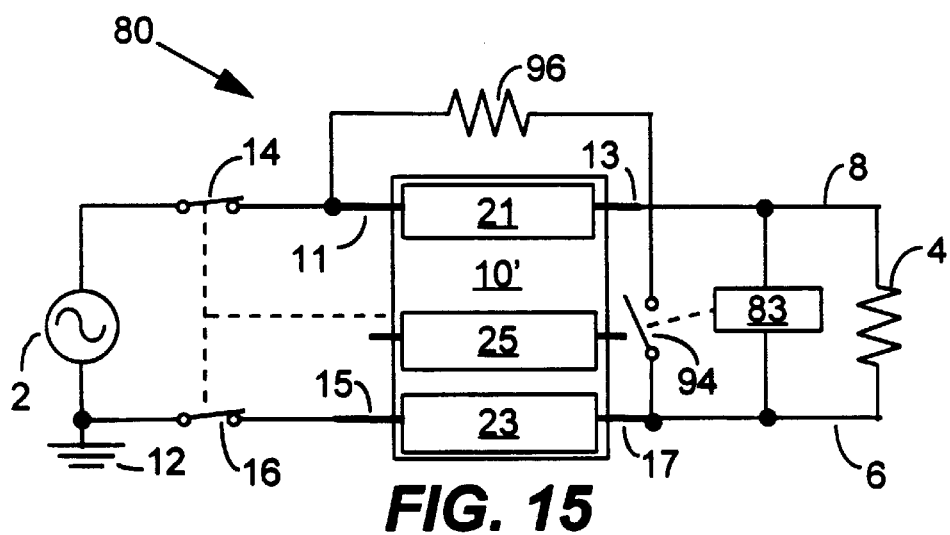
FIG. 15 is an example of the circuit of FIG. 14.

The circuit arrangement shown in FIG. 15 is an example of a fourth embodiment of a frequency-selective circuit protection system in accordance with this invention. In the circuit 80 the voltage difference between the line 8 and return line 6 is sensed by a frequency-selective voltage-sensing device such as a voltage-sensing relay coil 83. Depending on the frequency band of interest, the voltage-sensing relay coil 83 may be combined with one or more inductors and/or capacitors in high-pass, low-pass or band-pass arrangements which are known to those skilled in the art. If a frequency-selective voltage exceeds a predetermined threshold, the voltage-sensing relay coil 83 energizes, closing a set of relay contacts 94. A resulting imbalance current, limited by a resistor 96, causes the GFI circuit 10' to trip and open the contacts 14,16. The voltage-sensing relay coil 83 and relay contacts 94 may be replaced by a solid state current sensing and switching arrangement

What is claimed is:

1. A frequency-selective circuit protection arrangement for connection to an electrical path including a phase line and a return line between an alternating frequency power source supplying power at a line frequency and a load, comprising:
   a ground fault circuit interrupt switch for interrupting the electrical path in response to a trip current,
   a fault current detector transformer having a phase line winding connected in series with the phase line, a return line winding connected in series with the return line, and a current sense winding for detecting an imbalance in electrical currents at line frequency passing through the phase line and the return line and for generating and applying the trip current to operate the ground fault circuit interrupt switch, and
   a transformerless, frequency-selective bypass circuit for bypassing electrical currents at a selected frequency different than the line frequency around one of the phase line winding and the return line winding,
whereby when a current at the selected frequency is present at or above a predetermined minimum level, the bypass circuit causes an imbalance in current to flow through the fault current detector transformer and to cause the current sense winding to generate the trip current.

2. The frequency-selective circuit protection arrangement set forth in claim 1 wherein the ground fault circuit interrupt switch and the fault current detector transformer comprise elements of a conventional ground fault circuit interrupter.

3. The frequency-selective circuit protection arrangement set forth in claim 2 wherein the selected frequency is higher than the line frequency and wherein the bypass circuit comprises a capacitor connected to a phase line winding input and a return line winding input, the capacitor having a high impedance at the line frequency and a low impedance at the selected frequency.

4. The frequency-selective circuit protection arrangement set forth in claim 2 wherein the selected frequency is lower than the line frequency and wherein the bypass circuit comprises an inductor connected to a phase line winding input and a return line winding input, the inductor having a high impedance at the line frequency and a low impedance at the selected frequency.

5. The frequency-selective circuit protection arrangement set forth in claim 2 wherein the bypass circuit comprises a bandpass filter connected to a phase line winding input and to a return line winding input and having a pass-band low impedance at the selected frequency.

6. The frequency-selective circuit protection arrangement set forth in claim 5 wherein the bandpass filter comprises a series network of an inductor and a capacitor.

7. The frequency-selective circuit protection arrangement set forth in claim 1 wherein the fault current detector transformer has an unbalancing winding, and wherein the bypass circuit is connected in series with the unbalancing winding.

8. The frequency-selective circuit protection arrangement set forth in claim 7 wherein the unbalancing winding comprises two or more turns around a core of the detector transformer.

9. The frequency-selective circuit protection arrangement set forth in claim 2 wherein the fault current detector transformer of the conventional ground fault circuit interrupter includes a test winding, and wherein the bypass circuit is connected in series with the test winding.

10. The frequency-selective circuit protection arrangement set forth in claim 1 wherein the frequency-selective bypass circuit comprises an inductor in series with one of the phase line and the return line and a capacitor for bypassing one of the phase line winding and the return line winding, the inductor having a low impedance at the line frequency and a high impedance at the selected frequency, and the capacitor having a high impedance at the line frequency and a low impedance at the selected frequency.

11. The frequency-selective circuit protection arrangement set forth in claim 1 wherein the selected frequency is a harmonic frequency of the line frequency and wherein the frequency-selective bypass circuit comprises a parallel network and a series network, the parallel network comprising a first inductor and a first capacitor in series with one of the phase line and the return line and having a low impedance at the line frequency and a high impedance at the harmonic frequency, and the series network bypassing one of the phase line winding and return line winding and comprising a second inductor and a second capacitor and having a high impedance at the line frequency and a low impedance at the harmonic frequency.

12. The frequency-selective circuit protection arrangement set forth in claim 1 wherein the bypass circuit for bypassing electrical currents at a selected frequency different than the line frequency around one of the phase line winding and the return line winding comprises:
 a selected-frequency current detector in series with one of the phase line and the return line for detecting currents at the selected frequency at or above the predetermined minimum level and for generating a switching signal in response thereto,
 a series network comprising a resistance and a normally open bypass switch connected across one of the phase line winding and return line winding, the normally open bypass switch closing in response to the switching signal and causing an unbalancing current to flow through the transformer.

13. The frequency-selective circuit protection arrangement set forth in claim 12 wherein the ground fault circuit interrupter relay and the fault current detector transformer comprise elements of a conventional ground fault circuit interrupter.

14. The frequency-selective circuit protection arrangement set forth in claim 13 wherein the conventional ground fault circuit interrupter includes a test winding connected in series with the series network.

15. The frequency-selective circuit protection arrangement set forth in claim 1 wherein the bypass circuit for bypassing electrical currents at a selected frequency different than the line frequency around one of the phase line winding and the return line winding comprises:
 a selected-frequency voltage detector in parallel with the phase line and the return line for detecting voltages at the selected frequency at or above a predetermined minimum level and for generating a switching signal in response thereto, and
 a series network comprising a resistance and a normally open bypass switch connected across one of the phase line winding and return line winding, the normally open bypass switch closing in response to the switching signal and causing an unbalancing current to flow through the transformer.

16. The frequency-selective circuit protection arrangement set forth in claim 15 wherein the ground fault circuit interrupter relay and the fault current detector transformer comprise elements of a conventional ground fault circuit interrupter.

17. The frequency-selective circuit protection arrangement set forth in claim 16 wherein the conventional ground fault circuit interrupter includes a test winding connected in series with the series network.

* * * * *